United States Patent
Huang et al.

(10) Patent No.: US 8,647,497 B2
(45) Date of Patent: Feb. 11, 2014

(54) METHOD AND SYSTEM FOR HYDROGEN SULFIDE REMOVAL

(75) Inventors: Cunping Huang, Cocoa, FL (US); Franklyn Smith, Melbourne, FL (US); Clovis A. Linkous, Merritt Island, FL (US); Karthikeyan Ramasamy, West Richland, WA (US); Ali T. Raissi, Melbourne, FL (US); Nazim Muradov, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 201 days.

(21) Appl. No.: 13/352,016

(22) Filed: Jan. 17, 2012

(65) Prior Publication Data

US 2012/0148465 A1 Jun. 14, 2012

Related U.S. Application Data

(63) Continuation-in-part of application No. 12/359,858, filed on Jan. 26, 2009, now abandoned.

(60) Provisional application No. 61/023,755, filed on Jan. 25, 2008.

(51) Int. Cl.
    *C01B 17/05* (2006.01)
    *B01D 53/52* (2006.01)
(52) U.S. Cl.
    USPC ........... 205/687; 205/703; 205/744; 205/746; 204/228.3; 204/263; 204/265; 423/564

(58) Field of Classification Search
    USPC ............... 205/687, 703, 744, 746; 204/228.3, 204/263, 265; 423/564
    See application file for complete search history.

(56) References Cited

U.S. PATENT DOCUMENTS

| 4,436,711 A | 3/1984 | Olson |
| 4,832,937 A * | 5/1989 | McIntyre et al. .......... 423/573.1 |
| 5,391,278 A | 2/1995 | Honna et al. |

* cited by examiner

*Primary Examiner* — Arun S Phasge
(74) *Attorney, Agent, or Firm* — Jetter & Associates, P.A.

(57) ABSTRACT

A system for hydrogen sulfide removal from a sour gas mixture including hydrogen sulfide. The sour gas mixture is reacted with a transition metal compound in a scrubber. Sulfide from the hydrogen sulfide is oxidized to form elemental sulfur and the transition metal is reduced to form a reduced state transition metal compound. An electrochemical redox reaction is performed including the reduced state transition metal compound to regenerate the transition metal compound in an electrolyzer including a power source. During the electrochemical redox reaction a voltage from the power source applied to the electrolyzer is controlled to regenerate the transition metal compound at a rate sufficient to match a flow rate of hydrogen sulfide into the scrubber or maintain a predetermined maximum hydrogen sulfide level out from the scrubber. The transition metal compound regenerated is returned to the scrubber for the reacting.

12 Claims, 6 Drawing Sheets

METHOD AND SYSTEM FOR HYDROGEN SULFIDE REMOVAL

CROSS REFERENCE TO RELATED APPLICATIONS

This application is a continuation-in-part (CIP) application that claims the benefit of application Ser. No. 12/359,858 entitled "METHOD AND SYSTEM FOR HYDROGEN SULFIDE REMOVAL", filed Jan. 26, 2009, which claims the benefit of Provisional Application Ser. No. 61/023,755 entitled "METHOD AND SYSTEM FOR HYDROGEN SULFIDE REMOVAL", filed Jan. 25, 2008, which are both herein incorporated by reference in their entireties.

FIELD OF THE INVENTION

Embodiments of the invention are related to hydrogen sulfide ($H_2S$) removal.

BACKGROUND

Removal of $H_2S$ has become increasingly important because of the increased need for natural gas production. Approximately one-third of U.S. natural gas resources can be considered as low or sub-quality gas not suited for pipeline shipment with impurity concentrations in natural gas varying from traces to 90% by volume. In natural gas processing $H_2S$ is viewed as a pollutant because it corrodes pipelines and deactivates metal-based catalysts used in steam methane reformation (SMR). There are a number of known $H_2S$ removal processes practiced commercially or in bench scale demonstrations. Based on the $H_2S$ reactions involved, these technologies can generally be separated into three categories:

Decomposition: $H_2S = \frac{1}{2}S_2 + H_2 \Delta H°298K = 79.9$ kJ/mol

Reformation: $2H_2S + CH_4 = CS_2 + 4H_2 \Delta H°298K = 232.4$ kJ/mol

Partial oxidation: $H_2S + \frac{1}{2}O_2 = S + H_2O \Delta H°298K = -265.2$ kJ/mol Unfortunately, commercial systems based on any of the $H_2S$ removal processes shown above generally include one or more significant shortcomings, such as low efficiency and several technical issues, such as chelate loss, solution loss, slow oxidation rate. In addition, the scrubbers are generally complex designs that involve high capital and operation costs. What is needed is a new $H_2S$ removal process and related system that provides improved efficiency, and a relatively low capital cost system that also provides reliable and relatively low cost operation.

SUMMARY

This Summary is provided to comply with 37 C.F.R. §1.73, presenting a summary of the invention briefly indicating the nature and substance of the invention. It is submitted with the understanding that it will not be used to interpret or limit the scope or meaning of the claims.

Electrochemical redox methods and systems for implementing for continuous removal of hydrogen sulfide ($H_2S$) and other sulfur species from sour gas mixtures are described herein. The coulombic efficiency of such methods generally exceeds 90%.

In one embodiment, a method for $H_2S$ removal from a sour gas mixture comprising $H_2S$ comprises providing an aqueous solution comprising a transition metal compound, wherein a transition metal of the transition metal compound is at a first valence and has at least one reduction state from the first valence. The sour gas mixture is reacted with the transition metal compound and the aqueous solution in a scrubber, wherein sulfide from the $H_2S$ is oxidized to form elemental sulfur and the transition metal is reduced to form a reduced state transition metal compound.

An electrochemical redox reaction is performed including the reduced state transition metal compound to regenerate the transition metal compound in an electrolyzer comprising an anode, a cathode, and an electrolyte membrane between the anode and cathode. During the electrochemical redox reaction a voltage from the power source applied to the electrolyzer is controlled to regenerate the transition metal compound at a rate sufficient to match a flow rate of $H_2S$ into the scrubber, or to maintain a predetermined maximum $H_2S$ level out from the scrubber. The transition metal compound that is regenerated in the electrochemical redox reaction is then returned to the scrubber for the reacting.

The overall reaction in this embodiment is:

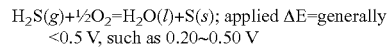

$H_2S(g) + \frac{1}{2}O_2 = H_2O(l) + S(s)$; applied $\Delta E$=generally <0.5 V, such as 0.20~0.50 V A system for $H_2S$ removal from a sour gas mixture comprising $H_2S$ is also disclosed. The system includes a scrubber having an inlet for receiving the sour gas mixture and an aqueous solution comprising a transition metal compound, wherein a transition metal of the transition metal compound is at a first valence and has at least one reduction state from the first valence. The scrubber is operable for reacting the sour gas mixture with the transition metal compound and the aqueous solution, wherein sulfide from the $H_2S$ is oxidized to form an elemental sulfur precipitate, the transition metal is reduced to form a reduced state transition metal compound, and an acid is formed. A sulfur capture device is coupled to an output of the scrubber operable to capture the elemental sulfur precipitate and provide a sweet gas output.

An electrolyzer is coupled to receive the reduced state transition metal compound and the acid. The electrolyzer comprises an anode, a cathode, and an electrolyte membrane between the anode and cathode for performing an electrochemical redox reaction including the reduced state transition metal compound to regenerate the transition metal compound. During the electrochemical redox reaction a voltage from the power source applied to the electrolyzer is controlled to regenerate the transition metal compound at a rate sufficient to match a flow rate of $H_2S$ into the scrubber, or to maintain a predetermined maximum $H_2S$ level out from the scrubber. A connector is provided for coupling an output of the electrolyzer to an input of the scrubber, wherein the transition metal compound that is regenerated in the electrochemical redox reaction is returned to the scrubber.

DETAILED DESCRIPTION

Figure 1:
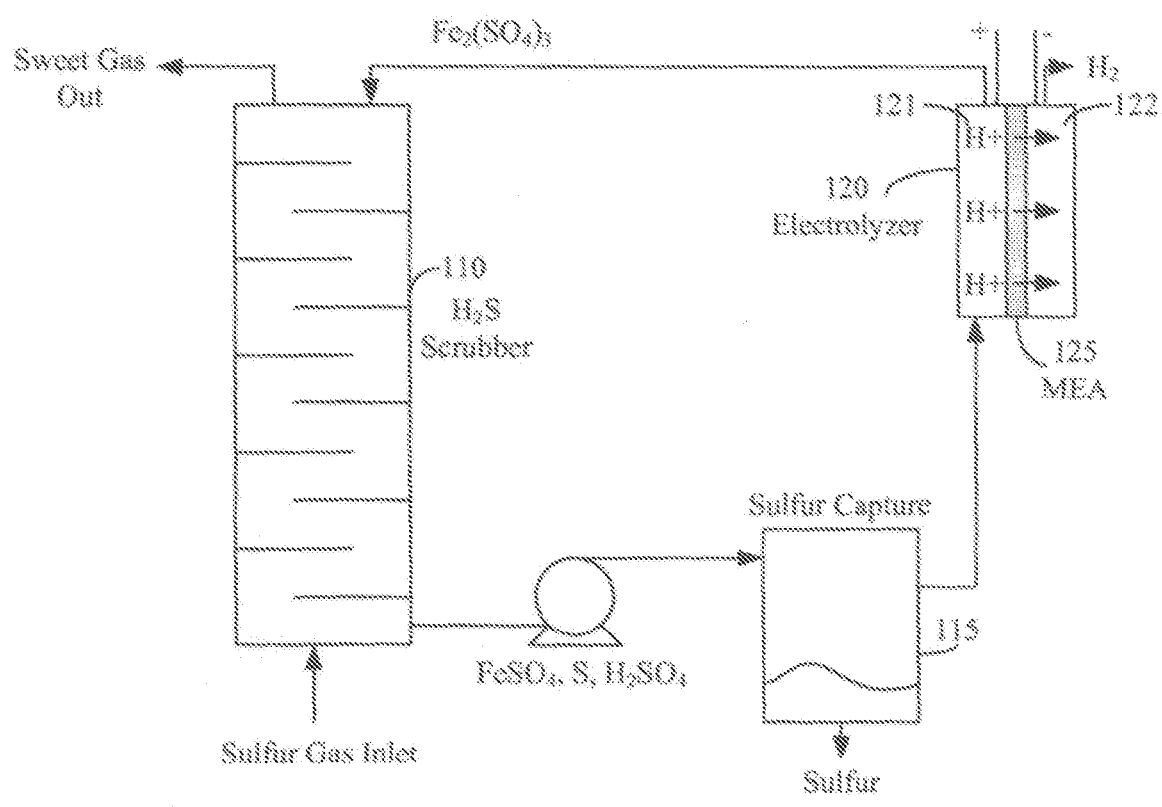
FIG. 1 is a schematic diagram showing an exemplary system operable for continuous removal of $H_2S$ and sulfur from sour gas, wherein the system provides production of gaseous hydrogen.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the invention provide methods and systems for removing $H_2S$ from a sour gas mixture. As used herein, a "sour gas mixture" refers to a $H_2S$ comprising gas mixture, such as $H_2S$ mixed with carbon dioxide, carbon monoxide, hydrogen, nitrogen, a hydrocarbon (e.g. methane) or a hydrocarbon mixture (e.g. natural gas). Sour gas mixtures can be obtained from natural gas, landfill gas, gas from light hydrocarbon fuel reformation, and other sources. Embodiments of the method comprise providing an aqueous solution comprising a transition metal compound, such as a sulfate, oxide, sulfide or carbonate. The transition metal is at a first valence and has at least one reduction state from the first valence. The gas mixture is reacted with the transition metal compound in a scrubber, wherein sulfide from the $H_2S$ is oxidized to form an elemental sulfur precipitate, the transition metal is reduced to form a reduced state transition metal compound, and an acid is formed.

The sulfur generally precipitates as a fine powder that can be filtered out of the scrubber solution so that the sulfur precipitate can be removed. An electrochemical redox reaction is then performed in an electrolyzer, wherein electrochemical oxidation of the reduced state transition metal occurs to recover the transition metal compound. The transition metal compound is then returned to the scrubber for the reacting step.

The electrochemical redox reaction can utilize a proton conducting membrane, such as a membrane electrode assembly (MEA). Various transition metals may be used, since ions of the transition elements generally have multiple stable oxidation states, because they can lose d electrons without a high energetic penalty. Fe is one of the transition metals. Iron, cobalt and nickel show similar properties as compared to iron. Regarding chemical properties of iron, as known in the art, iron shows variable valence. Since Fe has only 2 electrons in its N-shell, it gives off electrons easily. Fe (II) (ferrous) has valence=$2^+$. Fe is able to show $3^+$ valence by emitting one electron from the M-shell. Fe (III) (ferric) has valence=$3^+$.

In one particular embodiment the transition metal compound comprises ferric sulfate and the acid comprises sulfuric acid. The electrochemical redox reaction can be used to reduce protons from the acid into hydrogen gas. In another embodiment of the invention described relative to FIGS. 2A and 2B below, oxygen gas is added to the cathode, wherein the oxygen is reduced and reacts with protons from the acid to form water.

Two exemplary method embodiments are described below which both embody the transition metal compound as ferric sulfate and the acid as sulfuric acid. However, as noted above, other transition metal compounds and other acids may be used.

In a first method embodiment, the overall reaction shown below decomposes $H_2S$ to produce elemental sulfur and hydrogen. The process can be practiced as a closed-loop process, where the ferric sulfate $Fe_2(SO_4)_3$ is regenerated.

$Fe_2(SO_4)_3(aq)+H_2S(g) \rightarrow 2FeSO_4(aq)+H_2SO_4(aq)+S(s)$ (Chemical absorption)

$2FeSO_4(aq)+H_2SO_4(aq) \rightarrow Fe_2(SO_4)_3(aq)+H_2(g)$ ($\Delta E$=0.80 V to 1.15 V)

$H_2S(g) \rightarrow H_2(g)+S(s)$; $\Delta E$=0.80~1.15 V (Overall reaction)

FIG. 1 is a schematic diagram showing an exemplary system 100 operable for continuous removal of $H_2S$ and sulfur from sour gas, which also provides production of gaseous hydrogen. A gaseous mixture containing $H_2S$ enters into a scrubbing unit 110 shown as a $H_2S$ scrubber which includes an absorption column. $H_2S$ when dissolved in the aqueous medium is ionized to $H^+$ and $S^{2-}$. In the scrubbing unit 110, the $S^{2-}$ is oxidized by polyvalent metal ions such as those of iron, which can exist in both ferric ($Fe^{3+}$) and ferrous ($Fe^{2+}$) state to produce elemental sulfur. Elemental sulfur generally has commercial value. Ferric sulfate, $Fe_2(SO_4)_3$ is reduced into ferrous sulfate, $FeSO_4$. The hydrogen ions from $H_2S$ oxidation and excess sulfate ions from ferric sulfate reduction form aqueous sulfuric acid, $H_2SO_4(aq)$.

Elemental sulfur is then removed from the system in a sulfur capture vessel 115, and the remaining ferrous sulfate solution is fed to an electrolyzer 120 comprising anode 121, cathode 122, and an electrolyte membrane 125, such as a membrane electrode assembly (MEA). In the electrolyzer 120, ferrous sulfate is oxidized back to ferric sulfate. Accompanying the ferrous to ferric electro-oxidation process, hydrogen ions (protons) from sulfuric acid traverse the electrolyte membrane 125 and are reduced to hydrogen gas at the cathode 122 of the electrolyzer 120. The electrolyte membrane 125 facilitates proton transfer between anode and cathode. The regenerated ferric sulfate solution is then fed back to the absorption column of scrubber 110 for scrubbing H₂S, forming a closed cycle with the net reaction of H₂S decomposition into elemental sulfur and hydrogen gas. System 100 may be operated at ambient temperature and with easy start up and shut down procedures. The sweet gas output by system 100 provides low H₂S concentration, such as generally <2 ppm.

This first embodiment generally uses an electrolyzer potential that is controlled in a range from 0.80 to 1.15 volts in order for the electrochemical process to regenerate the scrubber solution at a rate sufficient to match the H₂S flow rate into the scrubber 110. The required electrical input power for the electrolytic unit may be provided from a number of energy sources including grid electricity, or from renewable energy sources, such as solar photovoltaic cells.

While scrubber 110 and electrolyzer 120 are linked in a closed system, disclosed embodiments recognize they do not necessarily perform at the same rate. When the transition metal is Fe, the scrubber 110 converts $Fe^{3+}$ to $Fe^{2+}$ at a rate dependent on the rate at which H₂S is introduced, i.e., the total gas flow rate times the mole percent of H₂S contained in it. The rate at which the electrolyzer 120 converts $Fe^{2+}$ to $Fe^{3+}$ is determined by the $Fe^{2+}$ concentration fed into the anode compartment and the applied voltage. These parameters are completely independent of each other. Thus if the gas feed is too fast, the $Fe^{3+}$ concentration in the scrubber 110 is consumed faster than the electrolyzer 120 can regenerate it, so that eventually the scrubber loses its capacity and H₂S bubbles out with the other gases. For best performance disclosed embodiments recognize there needs to be a balance between the two factors, so that the Fe conversion rates are equal and opposite.

Another part of the chemical balance is that the proton (or hydrogen ion, $H^+$) flux through the electrolyzer 120 (from anode to cathode through the solid membrane electrolyte) should match the rate of H₂S scrubbing and the rate of $Fe^{2+}$ electrolysis. If not, acid builds up inside the scrubber solution, affecting H₂S absorption efficiency. If the gas feed is slow but the applied voltage is high, acidity drops and the scrubber solution concentration will approach 100% $Fe^{3+}$, which is good for scrubber efficiency, but excess electricity is consumed. Actually, there is a limitation as to how high the applied voltage can be. Once the applied voltage exceeds 1.23 V, the oxidative electrolysis of water itself becomes possible:

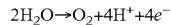

$$2H_2O \rightarrow O_2 + 4H^+ + 4e^-$$

Ferrous ion electrolysis becomes subjugated with respect to O₂ evolution. Excess electricity is consumed in producing by-product O₂. Furthermore, O₂ is normally considered to be an undesirable contaminant in reducing hydrocarbon gases that would be sweetened by this apparatus. Thus if the electrolyzer 120 is too small with respect to the scrubber 110, and the H₂S scrubbing load too great, it will be impossible for the electrolyzer to balance the system.

Disclosed embodiments include chemical balancing by varying the voltage applied to the electrolyzer 120 during operation of the system. A given H₂S molar flow rate can be mathematically correlated to an electrolytic current that must be obtained to support it. If the concentration of H₂S introduced is known, one can readily calculate how much current would be needed to draw through the electrolyzer 120 to support the scrubber 110. One can then impose a voltage necessary to draw that current. In a real world situation, where the H₂S content would only approximately be known, the signal from a H₂S sensor at the outlet of the scrubber 110 can be coupled to control the power supply voltage applied to the electrolyzer voltage. The sensor signal can cause the voltage to ramp up or down as necessary to maintain an acceptable H₂S level.

Although not shown in FIG. 1, to achieve chemical balancing a H₂S sensor can be positioned for sensing a flow rate of H₂S into the scrubber 110, or a flow rate of H₂S out from the scrubber 110, and a voltage regulator can be coupled to the external power source 135 for controlling a voltage from external power source 135 applied to electrolyzer 120 to regenerate the transition metal compound at a rate sufficient to match the flow rate of H₂S into the scrubber 110 or maintain a predetermined maximum level of H₂S out from the scrubber 110. These embodiments are described below relative to FIG. 2A and FIG. 2B, respectively.

Figure 2A:
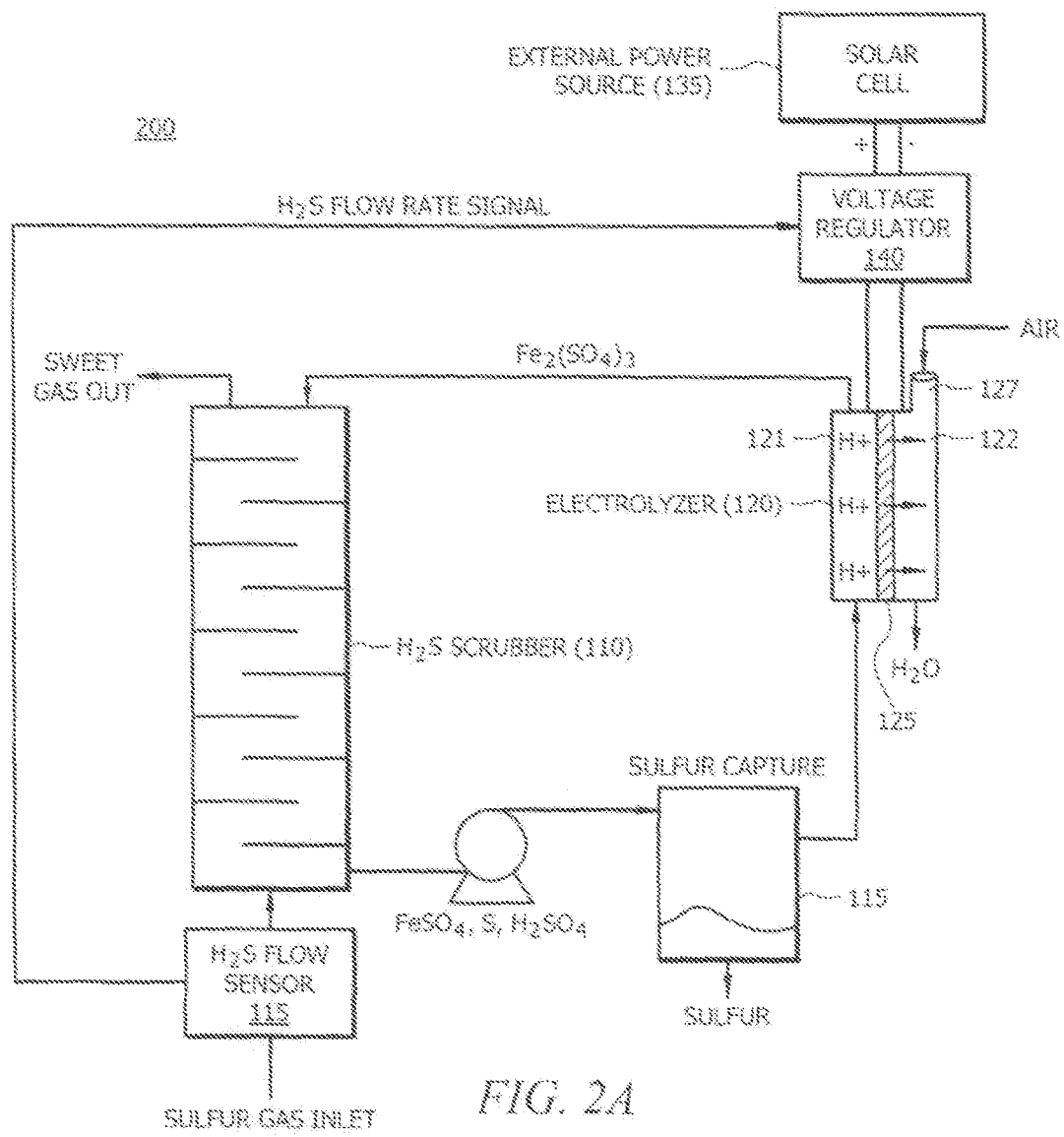
FIG. 2A is a schematic diagram showing an exemplary system operable for $H_2S$ removal by the partial oxidation of $H_2S$, wherein a $H_2S$ sensor positioned for sensing a flow rate of $H_2S$ into the scrubber, and a voltage regulator is coupled to the external power source of the electrolyzer for controlling a voltage from the power source applied to the electrolyzer to regenerate the transition metal compound at a rate sufficient to match the flow rate of $H_2S$ into the scrubber, wherein the system provides production of elemental sulfur and water.

FIG. 2A is a schematic diagram showing an exemplary system 200 operable for partial oxidation of H₂S, which produces elemental sulfur and water products. System 200 provides continuous removal of H₂S and sulfur species from sour gas using an oxygen source, such as air, fed via inlet 127 to the cathode 122 of the electrolyzer 120. In this case, H₂S absorption occurs in the same manner as described above relative to operation of system 100. The difference between the respective processes is that for the process performed by system 200 (or system 250 described below relative to FIG. 2B), air or other oxygen comprising gas is fed to the inlet of the cathode 122 of the electrolyzer 120. The oxygen (O₂) provided reacts with electrons provided by an external power source 135 shown as a solar cell and protons passing through the electrolyte membrane 125 to form water. The reactions for this embodiment are as follows:

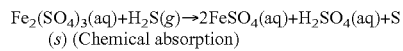

$Fe_2(SO_4)_3(aq) + H_2S(g) \rightarrow 2FeSO_4(aq) + H_2SO_4(aq) + S(s)$ (Chemical absorption)

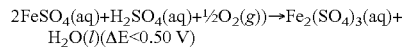

$2FeSO_4(aq) + H_2SO_4(aq) + \frac{1}{2}O_2(g) \rightarrow Fe_2(SO_4)_3(aq) + H_2O(l) (\Delta E < 0.50 \text{ V})$

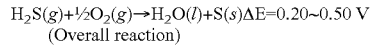

$H_2S(g) + \frac{1}{2}O_2(g) \rightarrow H_2O(l) + S(s) \Delta E = 0.20 \sim 0.50 \text{ V}$ (Overall reaction)

Figure 2B:
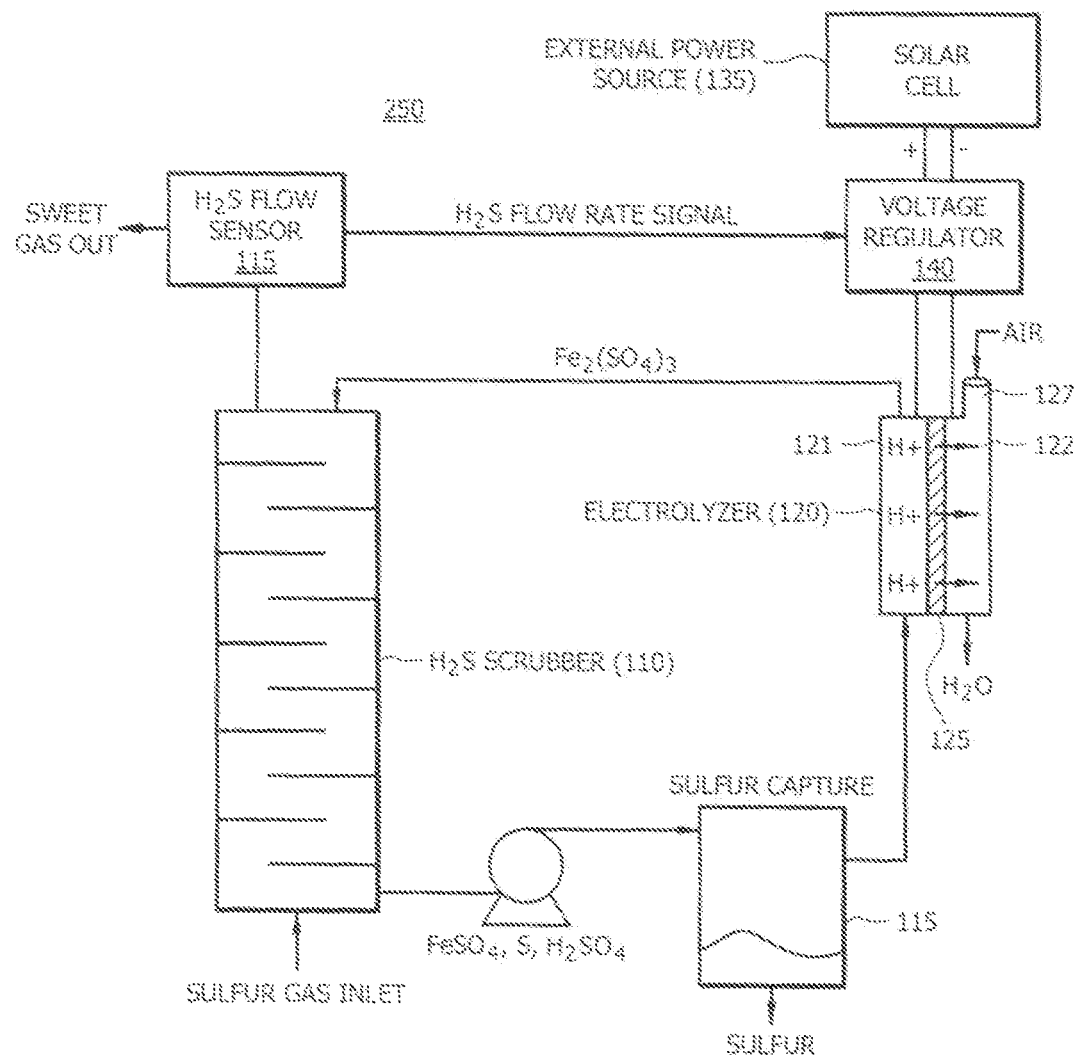
FIG. 2B is a schematic diagram showing another exemplary system operable for $H_2S$ removal by the partial oxidation of $H_2S$, wherein a $H_2S$ gas sensor is positioned for sensing a flow rate of $H_2S$ out from the scrubber, and a voltage regulator is coupled to the external power source of the electrolyzer for controlling a voltage from the power source applied to the electrolyzer to regenerate the transition metal compound at a rate sufficient to maintain a predetermined maximum level of $H_2S$ out from the scrubber, wherein the system provides production of elemental sulfur and water.

The external power source 135 shown as a solar cell is interfaced with a voltage regulator 140. Voltage regulator 140 controls the voltage applied to the electrolyzer 120 in order for the electrochemical process to regenerate the scrubber solution (shown as $Fe_2(SO_4)_3$) at a rate sufficient to match the H₂S flow rate into the scrubber 110 which is sensed by the H₂S flow sensor 115 shown. Although the H₂S flow sensor 115 is shown positioned for sensing a H₂S flow rate into the scrubber 110, those having ordinary skill in the art will recognize the H₂S flow sensor 115 may also be positioned in-line with the sweet gas output of electrolyzer 120 to enable the voltage applied by voltage regulator 140 to be controlled to maintain a predetermined maximum H₂S level, such as <2 ppm or <1 ppm. FIG. 2B is a schematic diagram showing another exemplary system 250 operable for H₂S removal by the partial oxidation of H₂S, wherein a H₂S sulfide gas sensor is positioned for sensing a H₂S flow rate out from the scrubber. A voltage regulator is coupled to the external power source of the electrolyzer 120 for controlling a voltage from the 135 power source applied to the electrolyzer to regenerate the transition metal compound at a rate sufficient to maintain a predetermined maximum level of H₂S out from the scrubber 110, wherein the system 250 provides production of elemental sulfur and water.

Like system 100, systems 200 and 250 may be operated at ambient temperatures and with easy start up and shut down procedures. The sweet gas output by system 200 provides low H₂S concentrations, such as generally <2 ppm. In contrast to system 100 which produces hydrogen gas at the cathode, water is generated by systems 200 and 250 which is energetically a more favorable reaction. As a result, the electrical energy requirement to regenerate the scrubber solution is significantly less than that of system 100, significantly reducing the overall operating costs of systems 200 and 250. Moreover, the use of oxygen depolarization of the cathode by systems 200 and 250 leads to a more compact system.

A prototype system analogous to system 100 has been constructed and continuously operated for more than 300 hours. Due to its low cost and high energy efficiency, embodiments of the invention are expected to find commercial use in many applications, including those for hydrogen generation at fueling stations. In this particular application, removal of sulfur (in the form of $H_2S$) from pre-reformed diesel fuel is needed for generating a sulfur-free pre-reformate to feed into a steam reformation process for production of hydrogen-on-demand and at vehicular fueling stations.

EXAMPLES

The Examples provided below show particular embodiments of the present invention. Embodiments of the invention are in no way limited by these Examples.

Figure 3:
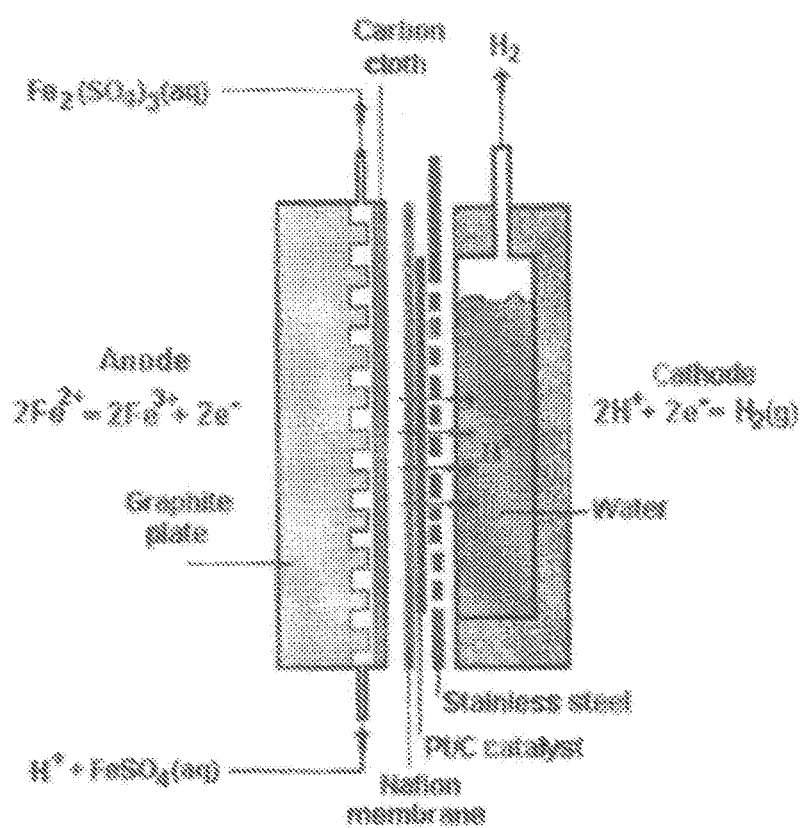
FIG. 3 shows an exemplary electrolyzer system that was used for the electro-oxidation of aqueous $FeSO_4$ described in the Examples section.

FIG. 3 shows an exemplary electrolyzer system 300 that was used for the electro-oxidation of aqueous $FeSO_4$ described in the Examples. System 300 includes a modified proton exchange membrane (PEM) fuel cell as shown in FIG. 3. Platinum catalyst was spray-deposited onto the cathode side of a NAFION® film to form a MEA. The cathode section consisted of a stainless steel plate used as current collector in contact with water for hydrogen evolution. This configuration eliminated the need for a carrier gas to sweep hydrogen from the cathode side of the electrolyzer.

Figure 4:
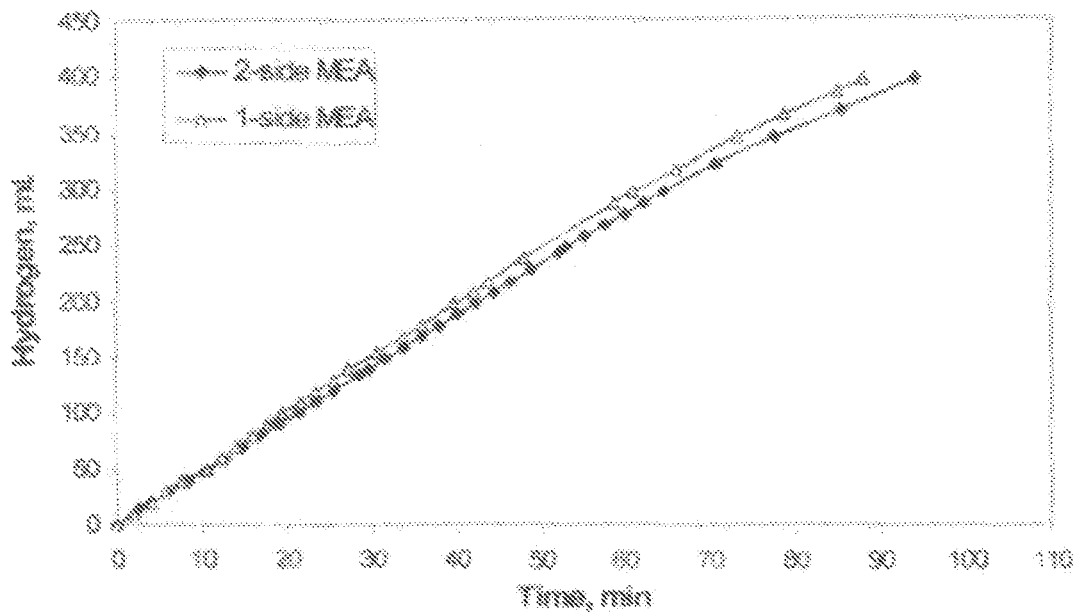
FIG. 4 shows data from electrolysis of an acidified $FeSO_4$ solution using a single and a double-sided MEA showing that oxidation of ferrous to ferric ions is not affected by lack of Pt catalyst at the anode, and that only about half the usual amount of Pt metal is needed for the electrolysis.

It is noted that no Pt catalyst was found to be needed for the oxidation of ferrous ions in the anodic section of the electrolyzer 300. FIG. 4 shows data from electrolysis of acidified $FeSO_4$ solution using a single and a double-sided MEA (Pt loading: 1.8 mg/cm$^2$, current density: 30-50 mA/cm$^2$, electrolyte: 0.5 N $H_2SO_4$+0.18 M $FeSO_4$, E=0.95 V). The data obtained shows that oxidation of ferrous to ferric ions is not affected by lack of Pt catalyst at the anode, indicating that only about half the usual amount of Pt metal is needed for the electrolysis. A plain carbon cloth can be used at the anode to allow distribution of both current and electrolyte.

Figure 5:
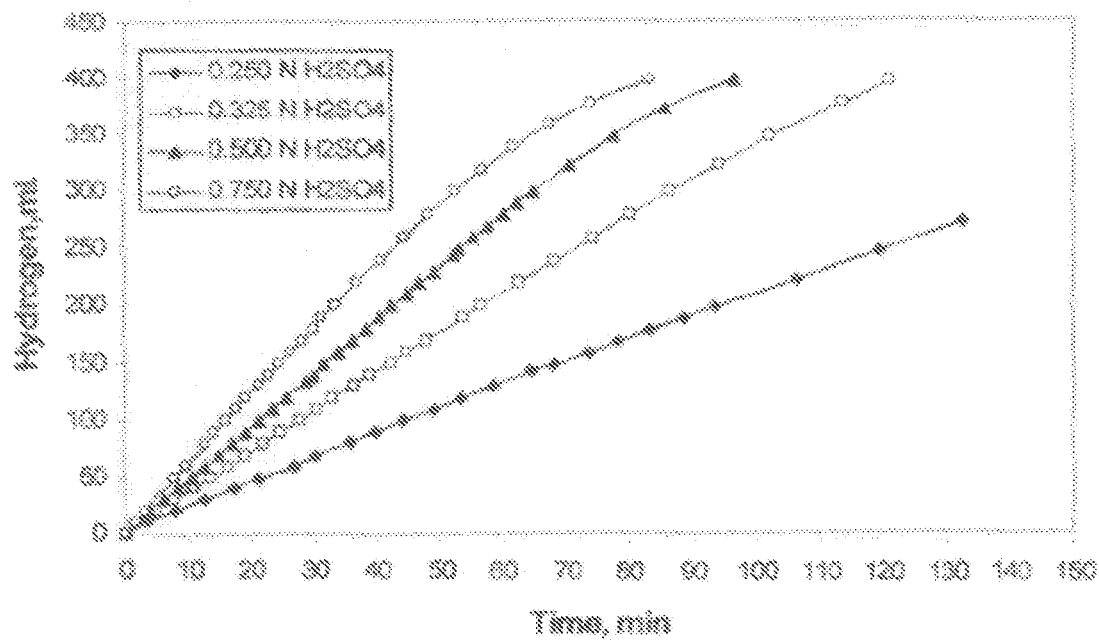
FIG. 5 shows hydrogen production by electrolysis of an acidified $FeSO_4$ solution under a first set of conditions.
Figure 6:
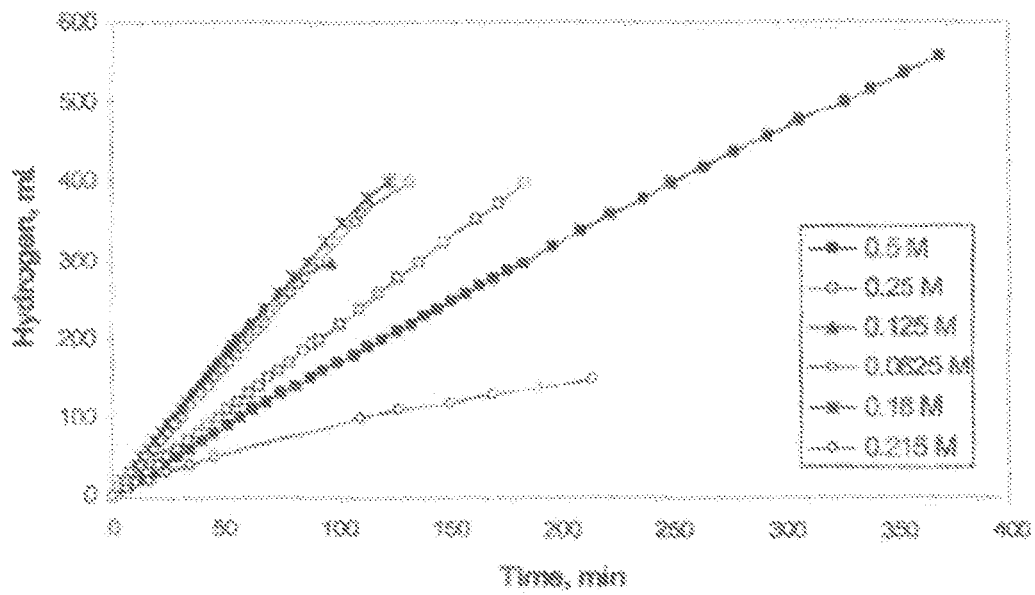
FIG. 6 shows hydrogen production by electrolysis of an acidified $FeSO_4$ solution under a second set of conditions.

FIG. 5 shows hydrogen production by electrolysis of acidified $FeSO_4$ solution (single-sided MEA, Pt loading: 1.8 mg/cm$^2$, 0.18 M $FeSO_4$, E=0.95 V). FIG. 6 shows hydrogen production by electrolysis of acidified $FeSO_4$ solution (single-sided MEA, Pt loading: 1.8 mg/cm$^2$, 0.325 N $H_2SO_4$, E=0.95 V). FIGS. 5 and 6 show that $H_2SO_4$ and $FeSO_4$ concentrations both have significant effects on the hydrogen production rate via electrolytic process.

Figure 7:
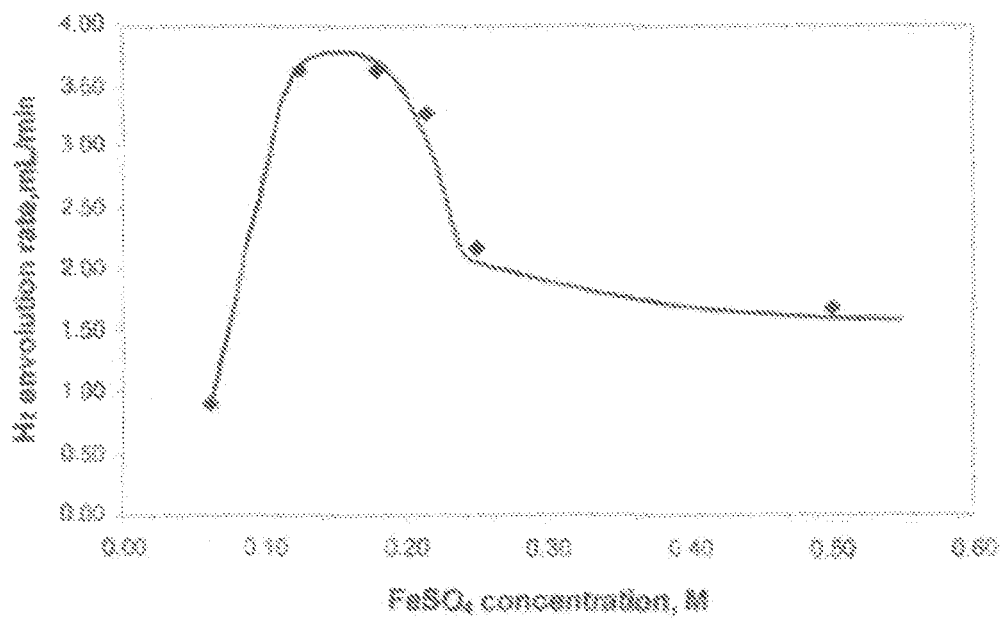
FIG. 7 shows hydrogen evolution rate as a function of $FeSO_4$ concentration under yet another set of conditions.

FIG. 7 shows hydrogen evolution rate as a function of $FeSO_4$ concentration (single-sided MEA, Pt loading: 1.8 mg/cm$^2$, 0.325 N $H_2SO_4$, average pulse voltage=0.95 V). While hydrogen evolution increases linearly with increased $H_2SO_4$ concentration (not shown here), there was found to exist an optimal concentration of $FeSO_4$ (0.20 M) that corresponds to the maximum hydrogen production rate as shown in FIG. 7.

CONCLUSIONS FROM THE EXAMPLE DATA

It has been shown that the electrolysis of acidified $FeSO_4$ aqueous solution is highly efficient with a columbic efficiency approaching 100% at applied voltage of 1.0 V or lower. The effect of reaction conditions, such as pH, $FeSO_4$ concentration, and temperature were investigated. It has been shown that the electrolysis process can be conducted with a Pt-free anode capable of oxidizing ferrous to ferric ions, thereby, reducing the cost of the electrolytic system.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

We claim:
1. A method for hydrogen sulfide removal from a sour gas mixture comprising hydrogen sulfide, comprising:
   providing an aqueous solution comprising a transition metal compound, a transition metal of said transition metal compound being at a first valence and having at least one reduction state from said first valence;
   reacting said sour gas mixture with said transition metal compound and said aqueous solution in a scrubber, wherein sulfide from said hydrogen sulfide is oxidized to form elemental sulfur and said transition metal is reduced to form a reduced state transition metal compound;
   performing an electrochemical redox reaction using an electrolyzer, said electrochemical redox reaction including said reduced state transition metal compound to regenerate said transition metal compound in said electrolyzer, said electrolyzer comprising an external power source that supplies power to drive said electrochemical redox reaction, an anode, a cathode, and an electrolyte membrane between said anode and said cathode,
   wherein during said electrochemical redox reaction a voltage from said external power source applied to said electrolyzer is controlled to regenerate said transition metal compound at a rate sufficient to match a flow rate of said hydrogen sulfide into said scrubber or to maintain a predetermined maximum level of said hydrogen sulfide out from said scrubber, and returning said transition metal compound that is regenerated in said electrochemical redox reaction to said scrubber for said reacting.

2. The method of claim 1, wherein said sour gas mixture comprises at least one hydrocarbon.

3. The method of claim 2, wherein said sour gas mixture comprises natural gas, and a sweet gas output comprising said natural gas has concentration of said hydrogen sulfide that is <2 ppm.

4. The method of claim 1, wherein said elemental sulfur comprises an elemental sulfur precipitate, further comprising the step of removing said elemental sulfur precipitate.

5. The method of claim 1, wherein an oxygen comprising gas is added to said cathode during said electrochemical redox reaction, and wherein said voltage from said external power source is controlled to run at voltage of ≤0.5 V.

6. The method of claim 1, wherein said transition metal compound comprises ferric sulfate and a product of said reacting comprises sulfuric acid.

7. The method of claim 5, wherein said oxygen comprising gas comprises air.

8. A system for hydrogen sulfide removal from a sour gas mixture comprising hydrogen sulfide, comprising:

a scrubber having an inlet for receiving said sour gas mixture and an aqueous solution comprising a transition metal compound, a transition metal of said transition metal compound being at a first valence and having at least one reduction state from said first valence, said scrubber for reacting said sour gas mixture with said transition metal compound and said aqueous solution, wherein sulfide from said hydrogen sulfide is oxidized to form an elemental sulfur precipitate, said transition metal is reduced to form a reduced state transition metal compound, and an acid is formed;

a sulfur capture device coupled to an output of said scrubber operable to capture said elemental sulfur precipitate and provide a sweet gas output;

an electrolyzer coupled to receive said reduced state transition metal compound and said acid comprising an external power source that supplies power to drive an electrochemical redox reaction, an anode, a cathode, and an electrolyte membrane between said anode and said cathode for performing said electrochemical redox reaction including said reduced state transition metal compound to regenerate said transition metal compound, a hydrogen sulfide gas sensor positioned for sensing a flow rate of said hydrogen sulfide into said scrubber or a flow rate of said hydrogen sulfide out from said scrubber, a voltage regulator coupled to said external power source for controlling a voltage from said external power source applied to said electrolyzer to regenerate said transition metal compound at a rate sufficient to match said flow rate of said hydrogen sulfide into said scrubber or maintain a predetermined maximum level of said hydrogen sulfide out from said scrubber, a connector for coupling an output of said electrolyzer to an input of said scrubber, wherein said transition metal compound that is regenerated in said electrochemical redox reaction is returned to said scrubber by said connector for said reacting.

9. The system of claim 8, wherein said external power source comprises at least one solar cell.

10. The system of claim 8, wherein said electrolyte membrane comprises a membrane electrode assembly (MEA).

11. The system of claim 8, wherein said sour gas mixture comprises natural gas, and said sweet gas output comprising said natural gas has concentration of said hydrogen sulfide that is <2 ppm.

12. The system of claim 8, wherein said electrolyzer includes an inlet for receiving an oxygen comprising gas at said cathode during said electrochemical redox reaction.

* * * * *